United States Patent [19]

Fukuoka et al.

[11] Patent Number: 4,470,184

[45] Date of Patent: Sep. 11, 1984

[54] BEARING OF AN INTERNAL COMBUSTION ENGINE AND PROCESS FOR PRODUCING THE SAME

[75] Inventors: Tatsuhiko Fukuoka, Aichi; Takashi Fukuda; Shinichi Okamoto, both of Toyota, all of Japan

[73] Assignee: Taiho Kogyo, Ltd., Aichi, Japan

[21] Appl. No.: 296,853

[22] Filed: Aug. 27, 1981

Related U.S. Application Data

[62] Division of Ser. No. 109,488, Jan. 4, 1980, Pat. No. 4,309,064.

[30] Foreign Application Priority Data

Sep. 28, 1979 [JP] Japan ................................ 54-125543
Sep. 28, 1979 [JP] Japan ................................ 54-125544
Dec. 14, 1979 [JP] Japan ................................ 54-161568

[51] Int. Cl.³ ........................ B21D 53/10; F16C 33/12
[52] U.S. Cl. ........................ 427/383.7; 308/DIG. 8; 29/149.5 S; 148/127; 204/35.1
[58] Field of Search ............ 308/237 R, 241, DIG. 8, 308/DIG. 9, 237 A, 37; 277/235 A, 236; 29/149.5 S, 149.5 R, 148.4 R

[56] References Cited

U.S. PATENT DOCUMENTS

| | | | |
|---|---|---|---|
| 2,995,462 | 8/1961 | Mitchell et al. | 29/149.5 S |
| 3,150,901 | 9/1964 | Esten et al. | 308/DIG. 8 |
| 3,180,008 | 4/1965 | Elderkin et al. | 29/149.5 S |
| 3,308,524 | 3/1967 | Moyer | 308/241 |
| 3,513,520 | 5/1970 | Vandervell | 29/149.5 S |
| 3,768,378 | 10/1973 | Adams et al. | 308/241 |
| 3,793,195 | 2/1974 | Betts | 308/241 |

*Primary Examiner*—Howard N. Goldberg
*Assistant Examiner*—V. K. Rising
*Attorney, Agent, or Firm*—Burgess, Ryan & Wayne

[57] ABSTRACT

A bearing to be used in an internal combustion engine, comprises a base and an overlay layer formed on said base. The overlay layer comprises an alloy layer consisting of from 5 to 20%, preferably from 10 to 14%, of Sn, from 0.05 to 10%, preferably from 0.5 to 5%, of at least one element selected from the group consisting of In and Tl, from 0.05 to 5%, preferably from 0.2 to 2%, of at least one, wear resistance-enhancing element selected from the group consisting of Sb, Mn, Bi, Ni, Cu, Ca and Ba, and Pb and impurities in balance, all percentages being by weight. The bearing is satisfactorily reliable when used in recent internal combustion engines, wherein the output of the engines tends to be high, and further, the oil drain interval tends to be long.

The plating of layers and diffusion between these layers are conducted to produce a bearing which is reliable when used in the recent internal combustion engines.

17 Claims, 6 Drawing Figures

BEARING OF AN INTERNAL COMBUSTION ENGINE AND PROCESS FOR PRODUCING THE SAME

This is a division of application Ser. No. 109,488, filed Jan. 4, 1980, now U.S. Pat. No. 4,309,064.

The present invention relates to a bearing to be used in an internal combustion engine and a process for producing the same, and more particularly, a journal bearing, especially the journal bearing used around a crankshaft, as well as a process for producing the journal bearing.

The bearing to be used in an internal combustion engine, which is hereinafter referred to as a journal bearing, is manufactured by applying a bearing material layer on a base, such as a cylindrical bush, a semicylindrical metal base and a circular metal base. Such manufacturing technique is commonly used for the manufacturing of the journal bearing and any appropriate bonding means can be used for applying on the base the bearing material, which is hereinafter referred to as an overlay.

When the machining accuracy of the shaft and the housing, in which the journal bearing including the shaft is mounted, is low, and, further when the shaft is misaligned in the housing, the shaft is fitted improperly in the journal bearing. One purpose of the original overlays was to eliminate, by conformability of the overlay, the poor fitness between the journal bearing and the shaft. Another purpose of the original overlays was to provide the journal bearing with a foreign particle embedding property, so as to protect the journal bearing from such foreign particles as quartz and iron particles by embedding or burying the foreign particles in the overlays. Since the output of recent internal combustion engines, especially diesel engines, tends to be high, the overlay is subject to peeling off due to fatigue and to exhibit a poor capacity against a load. That is, the fatigue resistance and the capacity against a load of the binary lead alloys are not enough for the requirements of recent internal combustion engines. In addition, diesel engines tend to be used now more frequently than before for the purpose of decreasing the fuel consumption. Since, the explosion load and hence the load applied to the overlay of the diesel engines are higher than the gasoline engines, the overlay is subjected to a high load, so that the capacity against a load of the binary lead alloys is inappropriate for the overlay of the diesel engines. In addition, the overlay of the diesel engine is subjected to a reciprocating high load over a long period of time, with the result that fatigue is induced in the overlay. Because of the fatigue of the overlay, the overlay of the binary lead alloys is peeled off and can no longer maintain such conformability and embedding properties as are required for the use of the overlay in the diesel engine. Further, since recent gasoline engines tend to rotate at a high rotating speed, the capacity against load and the peeling off resistance of the binary lead alloys are insufficient for such engines.

In recent internal combustion engines, particularly diesel engines, the interval of draining the lubricating oil, which is hereinafter simply referred to as oil drain interval, is long. A corrosive wear of the overlay is caused by corrosive organic acids formed in the lubricating oil during such a long oil drain interval. Since corrosion resistance of the conventional binary lead alloys is insufficient for recent internal combustion engines, the overlay is worn out in a short period of time and the life of the journal bearing becomes short.

Recently, an additional element is being added to the binary alloys so as to improve the properties of those alloys when they are used as overlay alloys. Ternary alloys including the additional element mentioned above, for example, a Pb-Sn-Sb alloy and a Pb-Sn-Cu alloy are mainly used for the overlays. In studies conducted by the present inventors, it was discovered that none of these ternary lead alloys satisfy the resistances against wear, corrosion and fatigue required for the overlay to be used in recent internal combustion engines. The ternary, Pb-Sn-Sb alloy and the Pb-Sn-Cu alloy have a poor corrosion resistance, particularly against corrosive organic acids in the lubricating oil, and therefore, a premature damage of the overlay occurs, as explained in detail hereinbelow. A ternary Pb-Sn-In alloy must disadvantageously include a large amount of expensive indium additive, and further, premature damage of the overlay is generated particularly because the against capacity load and the wear resistance of this ternary alloy are poor. The overlay of the ternary Pb-Sn-In alloy is, therefore, not reliable.

In the foregoing explanation of the conventional overlay alloys, five properties of the alloys, i.e. the corrosion resistance, the fatigue resistance, the capacity against load, the wear resistance and the conformability, have been considered. In the case of using an overlay alloy in an actual internal combustion engine, these properties can be deemed to have mutual relationships, in that one poor property adversely influences the other properties and, hence, the reliability and life of the overlay are extremely deteriorated. The present inventors recognized that the enhancement of mainly wear resistance of the properties is important for recent internal combustion engines wherein a mechanical load applied to the overlay is increased more than in previous internal combustion engines, and further, wherein the lubricating state of the overlay is worse due to the long oil drain interval. The present inventors also discovered that, in addition to the composition of the overlay, the process for producing the overlay is important for the reliability thereof. In conventional overlay producing processes, a layer for the overlay was bonded on a substrate by an electrolytic plating, sintering, bonding by rolling and casting processes, and the like. When the layer of the overlay produced by these processes are porous, the reliability of the overlay becomes low, due to particularly a low resistance against fatigue. During the studies of journal bearings, particularly the overlays of the journal bearings, the present inventors recognized that a journal bearing pertinent to recent internal combustion engines cannot be provided by a technique of modifying the composition of the conventional ternary lead alloys. Based on the studies and discoveries mentioned above, the present invention has been completed.

It is an object of the present invention to improve all of the properties of a journal bearing over those of the journal bearings made of the conventional binary and ternary lead alloys.

It is another object of the present invention to provide a journal bearing which is satisfactorily reliable when used in recent internal combustion engines, wherein the output of the engines tends to be high, and further, the oil drain interval tends to be long.

It is a further object of the present invention to provide a process for producing a journal bearing which is reliable when used in the recent internal combustion engines mentioned above.

In accordance with the objects of the present invention, there is provided a journal bearing to be used in an internal combustion engine, wherein the bearing comprises a base and an overlay layer formed on the base, and further, the overlay layer comprises an alloy layer consisting of from 5 to 20% of tin, from 0.05 to 10% of at least one element selected from the group consisting of indium and thallium, from 0.05 to 5% of at least one wear resistance-enhancing element selected from the group consisting of antimony, manganese, bismuth, nickel, copper, calcium and barium, and lead and impurities in balance, all percentages being by weight. There is also provided a process for producing a journal bearing to be used in an internal combustion engine, said process comprising the steps of:

forming on a base of the journal bearing, a layer or layers comprising at least one element selected from the group consisting of indium and thallium, and at least one layer comprising lead, tin and at least one, wear resistance-enhancing element selected from the group consisting of antimony, manganese, bismuth, nickel, copper, calcium and barium, and;

heating the layers mentioned above to such a temperature that diffusion between the elements takes place, and further, that the overlay comprising the alloy layer, mentioned above, is formed by the diffusion.

The present invention is hereinafter explained with reference to the drawings, wherein.

Figure 1:
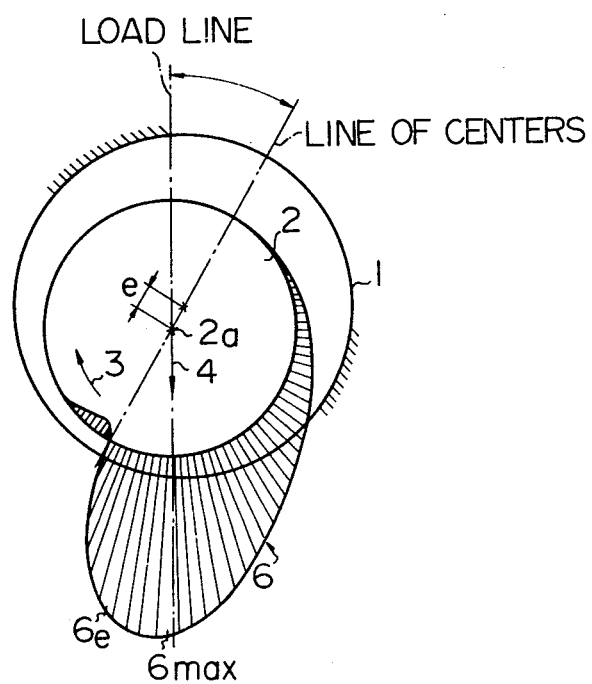
FIG. 1 is a schematic drawing for illustrating a journal bearing and a distribution of an oil film pressure generated in a lubricating oil which is present between the journal bearing and a shaft in the bearing.

In FIG. 1, the reference numeral 1 designates the overlay layer which is located at the outermost surface of the stationary member of the journal bearing. The reference numeral 2 designates a shaft rotated around the center of shaft 2a in the direction of arrow 3. The shaft 2 exerts a load on the overlay layer 1 via a not shown oil film along the direction of arrow 4. At the initial period after machining of the shaft and journal bearing, a surface roughness formed by the machining of the journal bearing remains on the surface of the overlay layer and the shaft. Such surface roughness is from 0.5 to 0.6 microns (μm) and from 0.6 to 0.7 microns (μm) on the surfaces of the overlay layer 1 and the shaft 2, respectively. When the rotation of shaft 2 in the direction of the arrow 3 is initiated, the surface of the overlay layer, which is soft, is planed by the shaft 2. As a result, a part of the overlay layer is adhered to the surface of the shaft 2 and a flow of the overlay layer due to the oil film pressure is generated. After the adhesion and flow of the overlay layer, a smooth rotation of the shaft 2 via a smooth contact surface between the shaft and the overlay layer can be realized, due to a conformability effect of the overlay layer.

Lead, which is a major component of the overlay according to the present invention, is a metal which is very high in comformability. Tin, indium and thallium, which are added to the lead, enhance the flowability of the lead to such an extent that an abrasive wear of the overlay due to the shaft is not liable to occur.

When the smooth rotation is initiated as described above, the oil film is caused to draw into a minute clearance between the overlay layer 1 and the shaft 2, due to viscous drag of the oil film. The shaft 2 is then brought into contact with the overlay layer 1 through an intermediary of the oil film which exists between the shaft 2 and the overlay layer 1. When the oil film is present between the shaft 2 and the overlay layer 1, the distribution of the pressure of the oil film is as indicated by a curve 6. The thickness of the oil film is varied in accordance with the variation of the load applied from the rotating shaft to the overlay layer. When the oil film becomes thin, the danger of direct contact of the shaft 2 with the overlay layer 1 becomes high. It is, therefore, extremely important for the journal bearings of the internal combustion engines that an oil film having a predetermined thickness, generally 2 microns, be located between the shaft 2 and the overlay laye 1 during the operation of the internal combustion engines. In order to assure the location of the oil film mentioned above, it is necessary to maintain the roughness of the shaft 2 and the overlay layer at an extremely low level. Such maintainance of the roughness can be provided by conformability, which is explained with reference to FIG. 1, or by the initial machining of the overlay layer and shaft. In recent internal combustion engines, in which the output and the load applied to the journal bearing tend to be high, the thickness of the oil film is less than in the previous internal combustion engines. The danger of direct contact of the shaft with the overlay layer is, therefore, high in recent internal combustion engines, and as a result, the surface of the journal bearing provided with a high smoothness may be damaged. Such damage actually occurs, when the shaft and overlay layer, which are in direct contact with one another when an internal combustion engine is stopped, are moved relative to each other by the starting of the engine. In addition, the surfaces of the journal bearing which are already smooth are caused to be uneven due to corrosion which is generated when an internal combustion engine is stopped for a long period of time.

In accordance with the present invention, tin, indium, thallium and the wear resistance-enhancing elements, such as manganese and the like, contribute to the maintainance of the smooth surface state of the journal bearing. Individually speaking, tin, indium and thallium enhance mainly the corrosion resistance of the overlay against corrosive organic acids in the lubricating oil. On the other hand, manganese and the like mainly enhance the wear resistance of the overlay.

In recent internal combustion engines, the concentration of corrosive organic acids becomes high when the engines are in use, because the oil drain interval tends to be long. The overlay is therefore, quickly corroded by the corrosive organic acids in the lubricating oil having a high temperature, for example from 80° to 140° C., in terms of the temperature of the oil in the oil pan. As a result of the corrosion mentioned above, the surface of the journal bearing provided with the smoothness mentioned above becomes uneven. The lining layer explained hereinbelow may be exposed due to the corrosion mentioned above and the lining exposure leads to generation of noise due to the lining being struck by the crankshaft and abnormal vibration of the internal combustion engine. Tin, indium, and thallium can effectively prevent the exposure of the lining layer.

The smoothness, which has been provided on the surface of the overlay layer, is also lost due to the distribution of oil film pressure as indicated by the curve 6 of FIG. 1. When the pressure is decreased from the maximum value 6 max to a value of, for example, 6e, the flow of the lubricating oil through a minute clearance between the shaft 2 and the overlay layer 1 is converted from a laminar flow to a turbulent flow, and simultaneously, cavities are formed in the turbulent flow. Therefore, a cavitation erosion due to the cavities occurs. In addition, the variation of the oil film pressure, which also induces the cavitation erosion, is also caused at joined portions between the bearing members and grooves in the journal bearing. When chemical corrosion due to the corrosive organic acids in the lubricating oil occurs in combination with the cavitation erosion, the portion of surface layer 1 corresponding to the position of the oil film pressure 6e is extremely damaged. Accordingly, an element of the group including manganese is added to the overlay, so as to enhance the wear resistance and cavitation corrosion resistance of the overlay, and hence, to eliminate damage to the overlay.

For the reasons explained hereinabove, the journal bearing according to the present invention is suitable for a member of an internal combustion engine which is subjected to a high explosion load from a piston of the internal combustion engine while a lubricating oil is supplied to the member. Concrete examples of using the journal bearing according to the present invention are a bearing of a crankshaft and a bearing for the large dimension end of a connecting rod of a gasoline engine and a Diesel engine. The journal bearing according to the present invention comprises, as in the conventional journal bearings, a steel base, a lining layer of a copper alloy and an aluminum alloy formed on the base, and the overlay layer formed on the lining. A flash plating layer of tin may occasionally be deposited on the overlay layer or on the outer surface of the base, lining and the overlay layer, so that the formation of rust is prevented by the tin layer, or so that the required percentage of tin in the overlay layer is supplied from the tin layer.

An alloy composition of the overlay according to the present invention will now be explained.

Tin, which is included in the lead-based overlay alloy according to the present invention, is an element which provides the lead alloy of the present invention with mainly a corrosion resistance and a wear resistance. In a binary, lead-tin alloy, since tin is dispersed in the alloy in a metallic form, the tin is liable to diffuse into the underlying lining layer. As a result, the wear resistance of the overlay disadvantageously becomes low while the overlay is being used. However, in the lead alloy of the present invention, which includes additives of indium (thallium) and manganese and the like, the tin is stabilized to such an extent that the diffusion mentioned above does not occur, because of a great tendency of forming the intermetallic compounds of tin. Reliability concerning conformability, corrosion resistance and wear resistance is enhanced, and furthermore, the corrosion resistance of the overlay against the corrosive organic acids formed in the lubricating oil is enhanced, because the tin is stabilized as explained above. When the tin content is less than 5%, the lead alloy of the present invention is not improved appreciably over the lead alloy containing 5% or more of tin. On the other hand, when the tin content exceeds 20%, the hardness of the overlay tends to be low at a high temperature, with the result that the properties, especially the wear resistance, of the overlay are seriously deteriorated during the use thereof. The tin content is preferably from 10 to 14%.

Indium and thallium enhance the chemical corrosion resistance of the overlay against the corrosive organic acids in the lubricating oil. In addition, the indium and thallium stabilize the tin, due to the formation of intermetallic compounds with tin, and enhance conformability of the overlay. When the content of at least one element selected from the group consisting of indium and thallium is less than 0.05%, the overlay is not improved appreciably over the lead alloy containing 0.05% or more of this at least one element. When the content of at least one element exceeds 10%, the overlay is so soft that wear resistance and cavitation erosion resistance of the overlay are reduced. The content of at least one element is preferably from 0.5 to 5%.

A lead based ternary overlay alloy containing tin and indium (thallium) is known, as explained in the description of prior art, and has achieved certain successful results concerning the conformability and the chemical corrosion resistance. However, in recent internal combustion engines, the output and load tend to be high, and further, the oil drain interval tends to be long. Although the bearing surface of the shaft and the overlay layer can be provided with a smoothness by means of utilizing the conformability effect of the overlay, the so provided smooth surface is constantly influenced by such factors as chemical corrosion, cavitation erosion, abrasive wear, and direct contact between the metals of the overlay and the shaft due to reduction in thickness of the oil film in recent internal combustion engines. Such influences cause an unevenness of the smoothed bearing surface. Once the unevenness of the bearing surface is initiated, the overlay, which exhibits conformability, is planed and a smooth bearing surface is again obtained. When the overlay exhibits no conformability due to excessive wear thereof, the life of the journal bearing comes to an end. In addition, any one of the influencing factors mentioned above which is more predominant than the other factors, frequently damages the overlay nonuniformly microscopically speaking. The nonuniformly damaged portions due to, for example, corrosion, are also liable to be damaged by the other factors, i.e., the abrasive wear, cavitation erosion and direct contact between the metals mentioned above. It is therefore believed that the overlay is damaged at the beginning slowly and gradually rapidly due to gradual derivation of damage due to a plurality of factors from the damage due to one factor. The present inventors recognized that it is important for the journal bearing to be used in recent internal combustion engines to prevent damage to the overlay due to one factor being the basis for damage to the overlay due to another factor. However, it is not easy to reproduce in a laboratory the damage of the overlay which occurs in actual internal combustion engines. Accordingly, the behaviour of the overlay used in actual internal combustion engines has previously been estimated from substitutional properties, such as wear amount and corrosion loss of the overlay. In this regard, the dynamic corrosion test explained hereinbelow can provide an estimate of the behaviour of the overlay used in actual internal combustion engines. The present inventors recognized that it was impossible to obtain excellent performance from overlays used in actual internal combustion engines by means of modifying the contents of the ingredients of the ternary, Pb-Sb-In(Tl) alloy mentioned above. The present Inventors discovered that, in order to obtain excellent performance from the overlays used in actual internal combustion engines, an element or elements, which enhance mainly the wear resistance of the lead based alloys, should be added to the lead based overlay alloy containing tin and indium (thallium). These additional elements are at least one element selected from the group consisting of antimony, manganese, bismuth, nickel, copper, calcium and barium, and are present in the lead alloy of the present invention in the metal form or in the form of intermetallic compounds with tin. Generally speaking, since conformability and wear resistance of the lead alloys are opposite to one another, the conformability of the lead alloys having an excessively high wear resistance is insufficient for an overlay. However, the wear resistance-enhancing elements according to the present invention advantageously exert almost no influence on the conformability. The wear resistance-enhancing elements will be individually explained hereinafter.

In the wear resistance-enhancing elements, copper enhances the most effectively, and nickel enhances the second most effectively, the wear resistance of the lead based overlay alloy containing tin and indium (thallium). However, copper and nickel reduce the corrosion resistance of the overlay. While barium and calcium have wear resistance-enhancing effects lower than nickel, they do have corrosion resistance-enhancing effects. Antimony has a wear resistance-enhancing effect lower than barium and calcium, but it has the highest corrosion resistance-enhancing effect. The wear resistance-enhancing effect and the corrosion resistance-enhancing effect of manganese are lower than antimony and calcium and barium, respectively. The wear resistance-enhancing effect of bismuth is the lowest, while the corrosion resistance-enhancing effect of antimony is the highest followed by bismuth.

When the content of the wear resistance-enhancing element or elements is less than 0.05%, the wear resistance of the lead based alloy containing tin and indium (thallium) is not effectively enhanced. When the content mentioned above exceeds 5%, the overlay hardness is so high that conformability of the overlay is reduced. The content mentioned above is preferably from 0.2 to 2%. It is possible to effectively prevent the diffusion into the lining layer of tin contained in the overlay having the composition explained above, when a nickel or silver plating layer having a thickness of from 1 to 3 microns is formed between the overlay layer and the lining layer.

The process for producing the journal bearing according to the present invention will now be explained with regard to the embodiments thereof.

An embodiment of the process for producing the journal bearing according to the present invention, comprises the steps of:

forming on a support lining a layer having a thickness of generally from 0.1 to 2 mm;

forming on the base, which consists of the support and the lining, a first layer comprising at least lead and tin;

forming on the first layer a second layer or layers comprising at least one element selected from the group consisting of indium and thallium, and;

heating said first and second layers to such a temperature that diffusion between the elements of these layers takes place. In this process, the second layer or layers include indium and/or thallium, and the first layer and the third layer explained hereinbelow include elements other than indium and/or thallium.

After the layers are formed, all elements of these layers are diffused into each other, so that a dense and homogeneous overlay layer is produced. The density and homogenity of the overlay layer is extremely important for preventing the peeling off thereof, which reduces the life and reliability during use of the overlay over a long period of time under a high reciprocating load of recent internal combustion engines, particularly diesel engines. In the embodiment mentioned above, the first layer may be formed by a plating containing lead and tin, and one or more wear resistance-enhancing elements, preferably calcium and barium in the form of fine powders, added into the plating bath of the first layer. These fine powders are drawn or incorporated into the plating layer when the plating bath is stirred during the plating. The fine powders have a size of from 0.1 to 1 micron. When the plating layer is heated or annealed at a temperature of, for example, from 100° to 200° C., the wear resistance-enhancing elements are uniformly distributed in the plating layer, thereby obtaining the alloy layer of the overlay layer. With regard to the stirring of the plating bath, it is preferable to stir the bath by a conventional pump which feeds the plating liquid at a rate of approximately from 0.1 to 2.0 l/sec.

The plating condition of the first layer is preferably as follows.

| Composition of Plating Bath (g/l): | |
| --- | --- |
| lead borofluoride [Pb (BF$_4$)$_2$] | 40–200; |
| tin borofluoride [Sn (BF$_4$)$_2$] | 5–30; |
| borofluoric acid [HBF$_4$] | 30–120; |
| hydroquinone | 0.5–3; |
| peptone | 0.1–3; |
| gelatine | 0.1–3; |
| β-naphthol | 0.1–3, and; |
| fine particles | 10–50. |
| Current Density (A/dm$^2$): | 1–5 |
| Temperature of Plating Bath (°C.): | 5–50 |

The plating condition of indium are shown in the following table.

TABLE 1

| | Composition A | Composition B-1 | Composition B-2 | Composition B-3 |
| --- | --- | --- | --- | --- |
| sulfamic acid indium compound | 40~210 | 105 ± 10 | 50 ± 10 | 200 ± 100 |
| sulfamic acid | 10~60 | 26 ± 5 | 15 ± 5 | 50 ± 10 |
| sodium chloride | 15~100 | 45 ± 5 | 20 ± 5 | 90 ± 10 |
| grape sugar | 2~25 | 8 ± 2 | 4 ± 2 | 20 ± 5 |
| triethanolamine | 1~5 | 2.25 ± 0.25 | 1.25 ± 0.25 | 4.5 ± 0.5 |
| sulfamic acid sodium compound | 70~320 | 150 ± 10 | 80 ± 10 | 300 ± 20 |
| Current Density (A/dm$^2$) | 1~10 | 2~10 | 2~10 | 2~10 |
| Temperature of Plating Bath (°C.) | 10~50 | 10~40 | 10~40 | 10~40 |

TABLE 1-continued

|  | Composition A | Composition B-1 | Composition B-2 | Composition B-3 |
|---|---|---|---|---|
| pH of Plating Bath | 3.8 or less | — | — | — |

In tables one and two the bath compositions are preferably composition B. The concentration of the borofluorides in the plating solutions mentioned hereinabove and below is in terms of metallic ion concentration.

The plating baths of borofluoride compounds shown in the following table may be used for the flash plating of indium.

TABLE 2

|  | Composition A | B(1) | B(2) |
|---|---|---|---|
| Composition of plating Bath (gl/l) |  |  |  |
| indium borofluoride [In (BF$_4$)$_3$] | 100–210 | 110 ± 10 | 200 ± 10 |
| borofluoric acid [HBF$_4$] | 10–35 | 15 ± 5 | 30 ± 5 |
| Boric acid | 15–60 | 25 ± 10 | 50 ± 10 |
| ammonium borofluoride | 40–110 | 50 ± 10 | 100 ± 10 |

The following plating bath of cyanide compounds may be used for the plating of indium.
Composition of Plating Bath (g/l):
  indium chloride—15–60;
  potassium cyanide—140–160;
  potassium hydroxide—30–40, and;
  dextrin—30–40.

The following plating condition is preferably used for the plating of thallium.
Composition of Plating Bath (g/l):
  thallium borofluoride—100–150;
  borofluoric acid—15–20;
  peptone—3–5, and;
  cresol—5–10.
Current Density (A/dm$^2$):—0.1–0.5
Temperature of Plating Bath (°C.)—15–25

In another embodiment of the process according to the present invention, a ternary alloy of lead, tin and a wear resistance-enhancing element is plated, and then, a plating of indium and/or thallium is conducted, followed by heating for the diffusion. The preferable wear resistance-enhancing element to be plated in the ternary alloy plating is copper and antimony.

The following plating condition is preferably used for the plating of the ternary alloy containing copper.
Composition of Plating Bath (g/l):
  lead borofluoride—150–200;
  tin borofluoride—5–15;
  copper borofluoride—1–3;
  gelatine—1–3, and;
  hydroquinone—1–3.
Current Density (A/dm$^2$)—3–5
Temperature of Plating Bath (°C.)—10–50

The following plating condition is preferably used for the plating of the ternary alloy containing antimony.

| Composition of Plating Bath (g/l): | |
|---|---|
| lead borofluoride [Pb (BF$_4$)$_2$] | 60–100; |
| tin borofluoride [Sn (BF$_4$)$_2$] | 8–16; |
| antimony borofluoride [Sb (BF$_4$)$_3$] | 0.05–0.5; |
| borofluoric acid [HBF$_4$] | 50–200; |

-continued

| Composition of Plating Bath (g/l): | |
|---|---|
| boric acid [H$_3$BO$_3$] | 15–80; |
| hydroquinone | 0.5–3, and; |
| peptone | 0.1–1. |
| Current Density (A/dm$^2$): | 1–5 |
| Temperature of Plating Bath (°C.): | 15–35 |

In a further embodiment of the present invention, a first alloy plating layer of a binary alloy of lead and tin is formed on the lining layer, a second layer(s) of indium and/or thallium is formed on the first layer, and a third layer containing a wear resistance-enhancing element is formed on the second layer, followed by the diffusion heating. The preferable wear resistance-enhancing elements to be plated as the third layer are manganese, bismuth and nickel.

The following plating condition is preferably used for the plating of manganese.
Composition of Plating Bath (g/l):
  manganese chloride—300–400;
  ammonium chloride—150–250, and;
  potassium rhodanate—1–3.
Current Density (A/dm$^2$)—5–10
Temperature of Plating Bath (°C.)—18–50
pH of Plating Bath—6.0–6.5

Nickel is preferably plated as an alloy of nickel and tin. The following condition is preferably used for the plating of the alloy.
Composition of Plating Bath (g/l):
  tin borofluoride—15–35;
  nickel borofluoride—40–80, and;
  ammonium fluoride—40–80.
Current Density (A/dm$^2$)—1–5
Temperature of Plating Bath (°C.)—50–70

In the embodiments mentioned above, a quaternary overlay alloy of lead, tin, indium (thallium) and a wear resistance-enhancing element is produced. It will be understood from the description of those embodiments that the process for the production of the overlays becomes complicated with the increase in the kinds of alloying components. The overlay containing more than four alloying components is not practical because the overlay producing process becomes complicated. However, when the plating processes explained in the embodiments mentioned above are utilized, the overlay alloy containing five or more of the alloying components can be produced as explained hereinafter.

In a process for producing an overlay, a first layer is formed by a ternary alloy plating of lead, tin and copper, a second layer is formed by the plating of indium and/or thallium and a third layer is formed by the plating of manganese, nickel or tin. In another process, fine particles of calcium and barium are added into a plating solution of the binary alloy of lead and tin or the ternary alloy of lead, tin and copper or lead, tin and antimony, and a plating of indium and/or thallium is conducted after the plating of the binary or ternary alloy. In a further process, after the plating of the binary or ternary alloy mentioned in said other process, a plating of manganese, bismuth or nickel is carried out.

In yet another embodiment of the present invention, a barrier layer or layers having a thickness of from 1 to 3 microns and consisting of silver and/or tin is formed on the lining layer prior to the plating step of the overlay layer, which lining layer is produced by either casting or sintering. Such barrier layer(s) can prevent the decrease of conformability of the overlay layer, which decrease occurs due to diffusion of tin into the lining layer during use of the journal bearing in internal combustion engines. The barrier layer(s) can be produced by the known plating processes of nickel and silver. The following known plating conditions may be used in the present invention.

A. Composition of Plating Bath
(Strike Plating Bath) (g/l):
 silver cyanide—3.7–5.2, and;
 potassium cyanide—75–90.
Bath Voltage (V)—4–6
Current Density ($A/dm^2$)—1.5–2.5
Temperature of Plating Bath (°C.)—20–30

B. Composition of Plating Bath (g/l):
 silver cyanide—4–6;
 potassium cyanide—15–20, and;
 potassium carbonate—15.
Bath Voltage (V): 2–4
Current Density ($A/dm^2$)—0.2
Temperature of Plating Bath (°C.)—20–25

C. Composition of Plating Bath (g/l):
 silver cyanide—36;
 potassium cyanide—60;
 potassium carbonate—15, and;
 brightener (carbon disulfide and an alcohol solution)—trace.
Current Density ($A/dm^2$)—0.5–4
Temperature of Plating Bath (°C.)—20–40

The brightener is, for example, 10 ml of ethyl alcohol, 2 ml of carbon disulfide and 5 ml of ethylether.

D. Composition of Plating Bath (g/l):
 silver cyanide—60
 potassium cyanide—135;
 potassium carbonate—45;
 potassium hydroxide—3;
 reaction products of acetylacetone and carbon disulfide—0.3, and; sulfonated oil. e.g, turkey-red oil—0.8
Current Density ($A/dm^2$)—0.5–40
Temperature of Plating Bath (°C.)—20–40

In the embodiment of forming the barrier layer(s), the barrier layer may be a single silver or nickel plating layer, or a double layer of a lower nickel plating layer and an upper silver layer, and is preferably this double layer.

In a still further embodiment of the present invention, an additional plating layer of tin is formed on the top plating layer of the overlay layer of the embodiments mentioned above, i.e. the second layer or the third layer. The tin plating layer has a thickness of from 1 to 3 microns and may also be formed on the entire surface of the base and the previously formed plating layers. The purpose of the additional plating layer of tin is to prevent the formation of rust on the rear surface of the journal bearing, which rust is formed from ten to twenty hours after use of the journal bearings. A further purpose is to compensate for the tin content of the first layer, which content is insufficient for the tin content of the alloy layer of the overlay layer. The additional plating layer of tin may or may not remain after the diffusion heating, due to which heating tin diffuses into the underlying layers. As a result of diffusion, the tin content of the first layer, which content is lower than the required content of tin in the overlay layer, is compensated for by the tin of the additional layer. Whether or not the additional layer of tin remains at the outermost portion of the overlay depends on the tin content of the first layer, the diffusion heating temperature and the thickness of the additional plating layer of tin. When the tin content of the first layer is from 4 to 9% and, further, when the thickness of the additional plating layer of tin is more than 1 micron, such additional layer tends to remain at the uppermost portion of the overlay.

It is supposed, because the remaining additional layer of tin is thin, that when the journal bearings of the present invention are mounted in internal combustion engines, the underlying layer of the remaining additional layer is quickly exposed after contact of this additional layer with the crankshaft and like due to conformability thereof. Desirable conditions for producing the overlay layer and the barrier mentioned above will now be explained.

First, the tin content of the first layer (containing at least Pb and Sn), which is formed by plating on the lining layer directly or via the barrier layer, is desirably not more than 10%, more desirably 8%. When the tin content exceeds 10%, the plating layers are not dense, with the result that the properties, particularly the fatigue resistance of the overlay, are deteriorated.

Second, if the thickness of the first layer, the second layer(s) of indium and/or thallium, and the third layer becomes large, the plating thickness of these layers may be varied locally. When the plating thickness is locally varied, it is difficult to obtain uniform plating layers and, sometimes, the peeling off of the nonuniform plating layers due to fatigue thereof may also result. The total thickness of the three layers is desirably not less than 5 microns and not more than 20 microns. The thickness of the first, second and third layers is desirably not more than 16, 2 and 2 microns, respectively.

Third, the lining layer is desirably composed of mainly copper, and additionally lead and tin. The lead and tin content of the lining layer is desirably from 5 to 25% and from 3 to 12%, respectively.

Fourth, the diffusion heating is desirably conducted at a temperature of 140° to 250° C., so that diffusion between each elements of the first, second and third layers, as well as the additional plating layer of tin, is realized. The required composition of the alloy layer is obtained by the diffusion. When uniform diffusion of the elements of the all layers takes place, the composition of the alloy layer is determined by the ratio of the content of elements in each layer and the weight of the overlay, and further, a single overlay layer is obtained. The uniform diffusion is desirable, because metal phases or intermetallic compound phases are finely dispersed in the matrix of the single overlay layer, and further, these phases are distributed throughout the overlay layer. Accordingly, a high temperature diffusion at a temperature of from 140° to 200° C. is generally conducted over a long period of time of from 60 to 120 hrs. However, such a high temperature diffusion over a long period of time may be undesirable depending upon the composition of each layer. In this regard, when the content of low melting point metal, for example, tin of one of the plating layers is so high that this layer melts or softens when the other layers neither melt or soften, a homogeneous and dense structure of the overlay cannot be obtained by the high temperature diffusion condition over a long period of time. In such a case, the diffusion temperature is desirably low. However, at a low diffusion heating temperature, a single overlay layer is not always obtained.

Hereinafter, the present invention will be explained in more detail by way of an Example.

EXAMPLE

In this example, the overlay layers of the following composition were produced.

TABLE 3

| Sample | Pb | Sn | In/Tl | Cu | Mn | Bi | Ni | Ca | Ba | Sb |
|---|---|---|---|---|---|---|---|---|---|---|
| 1 | balance | 5 | 0.05 | — | — | — | — | — | — | 2 |
| 2 | " | 5 | 3 | 0.5 | — | — | — | — | — | — |
| 3 | " | 8 | 1 | — | — | 1.0 | — | — | — | — |
| 4 | " | 8 | 6 | — | 5.0 | — | — | — | — | — |
| 5 | " | 11 | 2 | — | — | — | 0.1 | — | — | — |
| 6 | " | 11 | 7 | — | — | — | — | 2 | — | — |
| 7 | " | 14 | 3 | — | — | — | — | — | 3 | — |
| 8 | " | 14 | 9 | — | — | — | — | — | — | 0.2 |
| 9 | " | 17 | 1 | 3.0 | — | — | — | — | — | — |
| 10 | " | 17 | 5 | — | 1.0 | — | — | — | — | — |
| 11 | " | 20 | 5 | — | — | 4.0 | — | — | — | — |
| 12 | " | 20 | 10 | — | — | — | 2.0 | — | — | — |
| 13 | " | 9 | 7 | — | — | — | — | — | — | 0.3 |
| 14 | " | 5.5 | 1 | — | — | 0.1 | — | — | — | — |
| 15 | " | 10 | 2 | — | — | — | — | 1 | — | — |
| 16 | " | 16 | 3 | — | — | — | — | — | 1 | — |
| 17 | " | 10 | In 1 Tl 1 | — | — | — | — | — | — | 0.5 |
| 18 | " | 15 | In 2 Tl 0.5 | 1 | — | — | — | — | — | — |
| 19 | " | 10 | — | 2 | — | — | — | — | — | — |
| 20 | " | 10 | — | — | — | — | — | — | — | — |

The numerals in Table 3 are weight percent and the percentage of In/Tl is the percentage of indium unless specifically mentioned in Table 3. Samples 19 and 20 are control samples having overlay compositions which do not fall within the scope of the present invention.

On a steel sheet, a lining layer comprised of 23% of lead, 3.5% of tin and the balance in copper was formed by sintering, and a 2 micron thick nickel plating layer was formed on the lining layer as a barrier layer. Subsequently, the overlay layers having the composition as shown in Table 3 were formed on the barrier layer under the conditions explained hereinafter.

A-1. First Pb-Sn-Cu Layer and Second In Layer (Sample 2) —Sn<10%.

(1) Plating Condition of a Pb-Sn-Cu alloy
Composition of Plating Bath (g/l):
 lead borofluoride—160;
 tin borofluoride—20;
 copper borofluoride—0.5;
 gelatine—2, and;
 hydroquinone—2.
Current Density (A/dm$^2$)—5
Temperature of Plating Bath (°C)—25
Plating Thickness (micron)—16
(2) Plating Condition of In
Compositon of Plating Bath (g/l):
 sulfamic acid indium compound—105;
 sulfamic acid—26;
 sodium chloride—45;
 grape sugar—50;
 triethanolamine—5, and;
 sulfamic acid sodium comound—3
Current Density (A/dm$^2$)—3
Temperature of Plating Bath (°C)—25
pH of Plating Bath—2.2
Plating Thickness (microns)—2

A-2. First Pb-Sn-Cu Layer and Second In or In and Tl Layer (Samples 9, 18 and 19)—Sn≧10%

(1) Plating Condition of a Pb-Sn-Cu alloy

TABLE 4

| | Sample 9 | Sample 18 | Sample 19 |
|---|---|---|---|
| Composition of Plating Bath (g/l) | | | |
| lead borofluoride | 160 | 160 | 160 |
| tin borofluoride | 20 | 20 | 20 |
| copper borofluoride | 2 | 2 | 2 |
| gelatine | 2 | 2 | 2 |
| hydroquinone | 2 | 2 | 2 |
| Current Density (A/dm$^2$) | 2 | 5 | 3 |
| Temperature of Plating Bath (°C.) | 25 | 25 | 25 |
| Plating Thickness (microns) | 16.5 | 16 | 17 |

(2) Plating Condition of In and an In and Tl alloy

The plating condition of indium was the same as in item A-1(2), above, except that the thickness of indium plating layer of Sample 9 was 0.5 micron. The plating of the In and Tl alloy was conducted by, firstly, plating the indium to a thickness of 1 micron and, secondly, the thallium to a thickness of 0.5 micron.

The plating condition of thallium was as follows.
Composition of Plating Bath (g/l):
 thallium borofluoride—125;
 borofluoric acid—18;
 peptone—4, and;
 cresol—8.
Current Density (A/dm$^2$)—0.3
Temperature of Plating Bath (°C.)—20

(3) Plating Condition of Third Layer

Since 5% of tin would have been obtained by the first layer after the diffusion heating, a tin flash plating layer (additional plating layer of tin) was formed as the third layer to a thickess of approximately 2 microns so as to compensate for the tin of the first layer after diffusion heating.

B-1. First Pb-Sn Layer, Second In Layer and Third Layer of Wear Resistance-Enhancing Element (Samples 3, 4, and 14)—Sn<10%.

(1) Plating Condition of First Pb-Sn Layer

TABLE 5

| | Sample 3 | Sample 4 | Sample 14 |
|---|---|---|---|
| Composition of Plating Bath (g/l) | | | |
| lead borofluoride | 90 | 90 | 90 |
| tin borofluoride | 10 | 10 | 7 |
| gelatine | 2 | 2 | 0.5 |
| hydroquinone | 2 | 2 | 3 |
| Current Density (A/dm$^2$) | 5 | 5 | 3 |
| Temperature of Plating Bath (°C.) | 30 | 30 | 40 |
| Plating Thickness (microns) | 14 | 11 | 15 |

(2) Plating Condition of In

The plating condition of indium was the same as in item A-1 (2), above, except that the thickness of the indium plating layer in Sample 4 was 3 microns and in Sample 14 it was 0.5 micron.

(3) Plating Condition of Bi and Mn (a) Bi Plating

TABLE 6

|  | Sample 3 | Sample 11 |
|---|---|---|
| Composition of Plating Bath (g/l) | | |
| bismuth trioxide | 40 | 40 |
| perchloric acid | 140 | 140 |
| cresol | 1 | 1 |
| glue | 0.5 | 0.5 |
| Current Density (A/dm$^2$) | 5 | 5 |
| Temperature of Plating Bath (°C.) | 20 | 20 |
| Plating Thickness (microns) | 0.5 | 1 |

(b) Plating Condition of Mn (Sample 14)
Composition of Plating Bath (g/l):
  manganese chloride—350;
  ammonium chloride—200, and;
  potassium rhodanate—2.
Current Density (A/dm$^2$)—5
Temperature of Plating Bath (°C.)—22
pH of Plating Bath—6.5
Plating Thickness (microns)—3

B-2. First Pb-Sn Layer, Second In Layer and Third Layer of Wear Resistance-Enhancing Element (Samples 5, 10 and 12)—Sn≧10%.

(1) Plating Condition of First Pb-Sn Layer

The plating condition of the first Pb-Sn layer was the same as in Samples 3 and 4 in item B-1 (1), above except that the plating thickness in Sample 5 was 14 microns, in Sample 8 it was 11 microns and in Sample 12 it was 9 microns.

(2) Plating Condition of Second In Layer

The plating condition of indium was the same as in item A-1 (2), above, except that thickness of the indium plating layer of Samples 5, 10 and 12 was 2, 2.5 and 4.5 microns, respectively.

(3) Plating Condition of Third Layer
(a) Samples 5 and 12

TABLE 7

|  | Sample 5 | Sample 12 |
|---|---|---|
| Composition of Plating Bath (g/l) | | |
| tin borofluoride | 25 | 25 |
| nickel borofluoride | 60 | 60 |
| ammonium fluoride | 60 | 60 |
| Current Density (A/dm$^2$) | 3 | 3 |
| Temperature of Plating Bath (°C.) | 65 | 65 |
| Plating Thickness (microns) | 0.3 | 1 |

(b) Sample 10

The plating condition of manganese was the same as in item B-1, (3), (b), above, except that the thickness of the plating layer was 0.5 micron.

(4) Plating Condition of Fourth Layer

Flash plating of tin was conducted to a thickness of 1, 2 and 3 microns with regard to Samples 5, 10 and 12, respectively.

C. First layer of Pb, Sn and a Wear Resistance-enhancing Element, Second In Layer and Third Flash Plating Layer of Sn (Samples 6, 7, 15 and 16)—Sn≧10%

(1) Plating Condition of First Layer

TABLE 8

|  | Sample 6 | Sample 7 | Sample 15 | Sample 16 |
|---|---|---|---|---|
| Composition of Plating Bath (g/l): | | | | |
| lead borofluoride | 90 | 90 | 90 | 90 |
| tin borofluoride | 10 | 10 | 10 | 10 |
| gelatine | 2 | 2 | 2 | 2 |
| hydroquinone | 2 | 2 | 2 | 2 |
| Ca fine powders | 50 | — | 50 | — |
| Ba fine powders | — | 50 | — | 50 |
| Current Density (A/dm$^2$) | 3 | 3 | 3 | 3 |
| Temperature of Plating Bath (°C.) | 30 | 30 | 30 | 30 |
| Plating Thickness (microns) | 12 | 13.5 | 14.5 | 12 |

(2) Plating Condition of In

The plating condition of indium was the same as in item A-1 (2), above, except that the plating thickness in Sample 6 was 3.5 microns, in Sample 7 it was 1.5 microns, in Sample 15 it was 1 micron and in Sample 16 it was 1.5 microns.

(3) Flash Plating Condition of Sn

A flash plating layer of tin was formed to a thickness of 0.5, 0.8, 0.2–0.3 and 2.0 microns with regard to Samples 6, 7, 15 and 16, respectively.

D-1. First Pb-Sn-Sb layer and Second In layer (Samples 1 and 13)—Sn<10%

(1) Plating Conditions of Pb-Sn-Sb layer

TABLE 9

|  | Sample 1 | Sample 13 |
|---|---|---|
| Composition of Plating Bath (g/l) | | |
| lead borofluoride | 80 | 80 |
| tin borofluoride | 12 | 12 |
| antimony borofluoride | 0.3 | 0.3 |
| borofluoric acid | 120 | 120 |
| boric acid | 50 | 50 |
| hydroquinone | 2 | 2 |
| peptone | 0.5 | 0.5 |
| Current Density (A/dm$^2$) | 3 | 3 |
| Temperature of Plating Bath (°C.) | 25 | 25 |
| Plating Thickness (microns) | 10 | 15 |

(2) Plating Condition of In layer

The plating condition of the indium layer was the same as in item A-1 (2), above, except that the plating thickness in Sample 1 was 0.5 micron and in Sample 13 it was 3.5 microns.

D-2. First Pb-Sn-Sb layer, Second In or In and Tl Layer and Third Sn layer (Samples 8 and 17)—Sn≧10%

(1) Plating Condition of First Pb-Sn-Sb layer

The plating condition of the first layer of an alloy of lead, tin and antimony was the same as in item D-1 (1), above, except that the plating thickness in Sample 8 was 15 microns and in Sample 17 it was 18 microns.

(2) Plating Condition of Second In Layer and In and Tl layers

The plating condition of the indium layer of sample 8 was the same as in item A-1 (2), above, except that the plating thickness was 4.5 microns. The plating condition of the In and Tl layers was the same as in Sample 18 mentioned in item A-2 (2), above, except that the thickness of the indium and thallium layers were 0.7 and 0.7 micron, respectively.

(3) Plating Condition of Third Sn layer

The flash plating of tin was conducted to a thickness of 0.8 and 0.6 microns with regard to Samples 8 and 17, respectively.

E. Single Plating Layer of Pb-Sn or Pb-Sn-Cu alloy (Samples 19 and 20, control)

F. The plating condition of the single layer of Sample 20 was the same as in Sample 15, except that the fine particles of calcium were not added to the plating solution.

After the formation of the plating layers under the conditions explained hereinabove, the plating layers were heated to a temperature range of from 150° to 180° C. so as to produce the overlay layer by diffusion. Samples provided with the overlay layer were subjected to the corrosion resistance test under the following condition.

Lubricating Oil: Lubricating oil of SAE #30, into which 1% by weight of oleic acid was added as a corrosive organic acid.
Temperature of Oil: 120° C.
Testing Time: 60 days
Contact of Samples and Oil: Samples were completely immersed in the lubricating oil.

Figure 2:
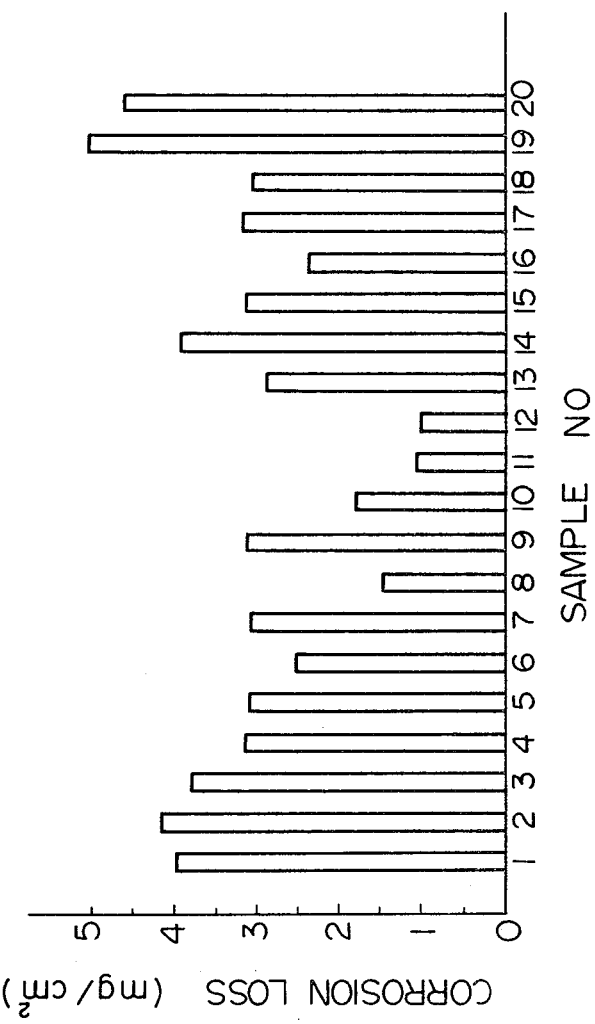
FIG. 2 is a graph of amounts of corrosion loss.

The corrosion loss (mg/cm$^2$) of the Samples after the test is illustrated in FIG. 2. As is apparent from FIG. 2, the Samples containing a high amount of indium, i.e. Sample 10 (5% In and 1.0% Mn), Sample 11 (5% In and 4.0% Bi) and Sample 12 (10% and 2.0% Ni), provided an excellent corrosion resistance. On the other hand, it should be noted that in Sample 9 (1% In and 3.0% Cu), with a low content of indium, a relatively good corrosion resistance was obtained. The wear resistance of the Samples provided with the overlay layer was tested under the following condition.

Figure 5:
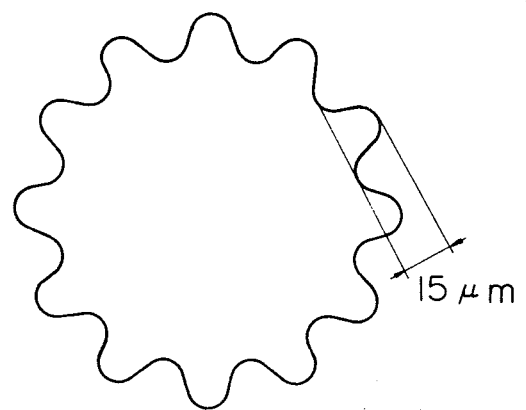
FIG. 5 illustrates a configuration of the shaft used in the test of wear amount.

Rotation Speed: 2000 r.p.m.
Surface Pressure: 130±130 kg/cm$^2$
Testing Time: 1.5 hours
Lubricating Oil: SAE #30
Temperature of Lubrication Oil: 120° C.
Material of Shaft: S 45C (carbon steel)
Shape of Shaft: Slotted shaft as shown in FIG. 5. Surface roughness of 0.4–0.8 micron.
Journal Bearing: Inner diameter of 55 mm. Surface roughness of sliding surface of 0.4–0.8 micron.

Figure 3:
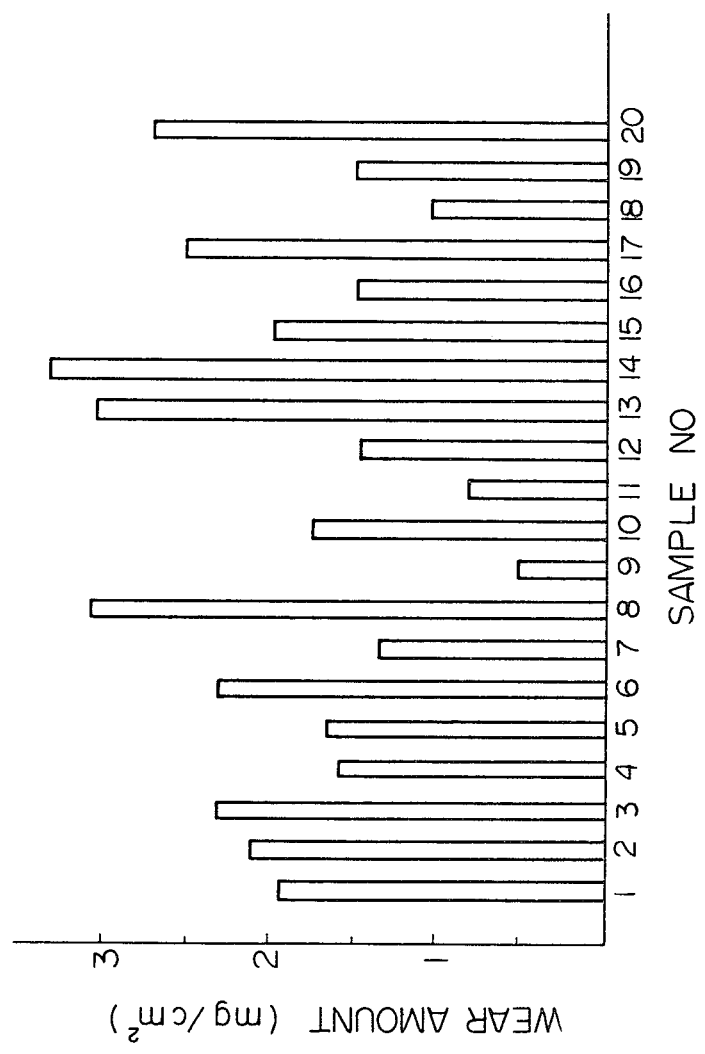
FIGS. 3 and 4 are graphs of wear amounts.

The testing machine used was a repeating type fatigue tester for a journal bearing under dynamic load. The weight loss of the Samples after the test is illustrated in FIG. 3. As is apparent from FIG. 3, the wear resistance of Sample 9 (3.0% Cu), Sample 11 (4.0% Bi) and Sample 18 (1% Cu) was excellent.

Figure 4:
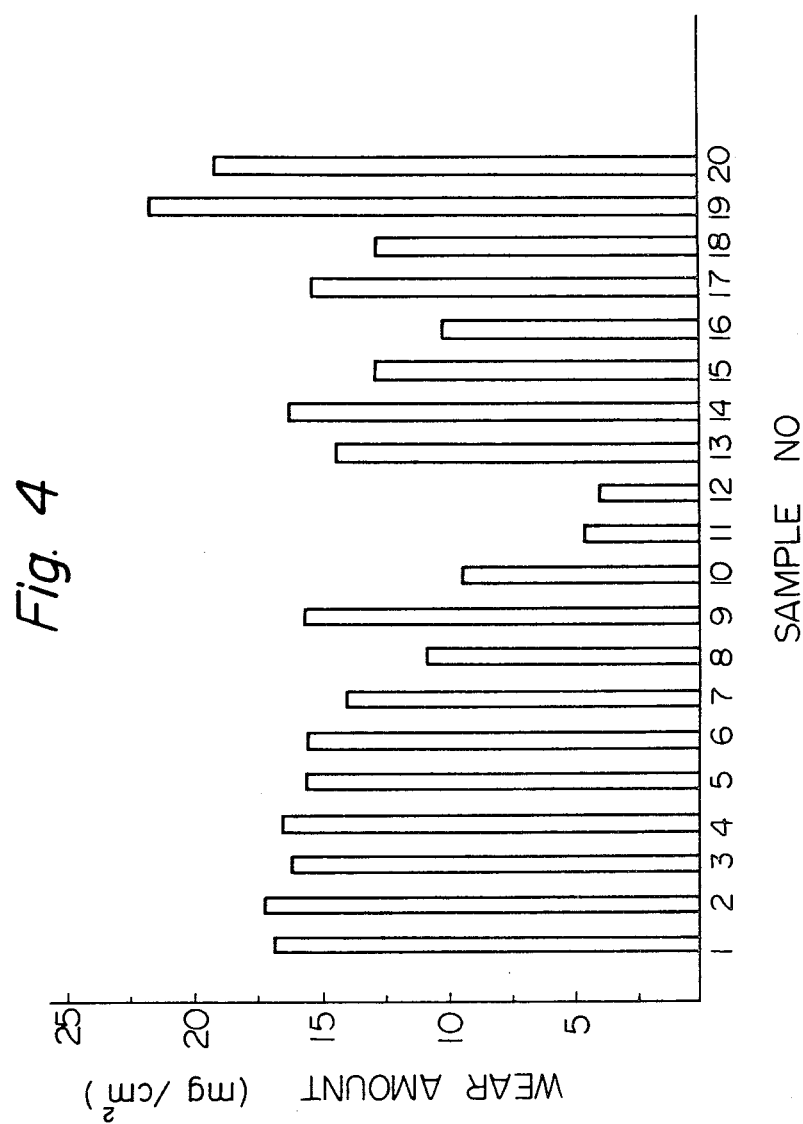

The test under the condition mentioned above was carried out by changing the testing time to 200 hours. The results of the test over the long test period are illustrated in FIG. 4. From a comparison of FIG. 4 with FIG. 3 it is apparent that the tendencies of wear indicated in FIG. 4 are different from those in FIG. 3. This is believed to be the result of damage to the Samples, which is caused by in addition to wear, a corrosion of the Samples over the long 120 testing time. Samples 1 through 18 of the present invention exhibit excellent properties against long time wear.

The Samples provided with the overlay layer were tested by a dynamic corrosion test under the following conditions so as to test the properties of the overlay under conditions in which chemical corrosion and mechanical wear take place simultaneously.

Figure 6:
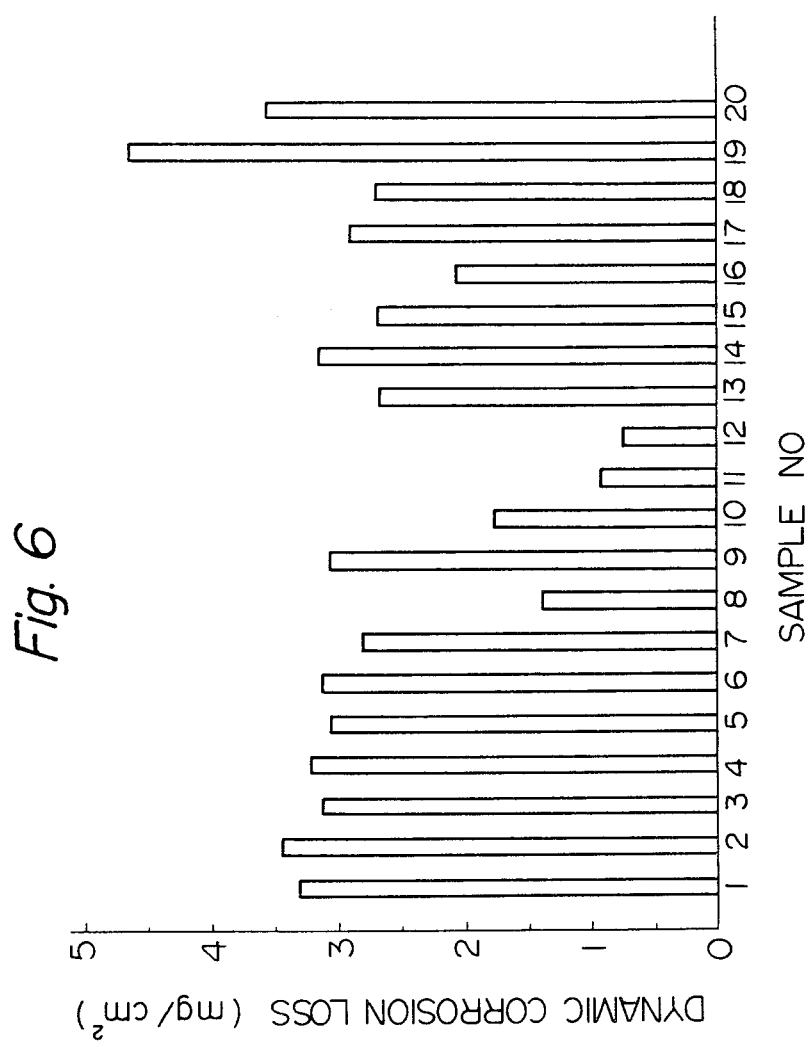
FIG. 6 is a graph of amounts of dynamic corrosion loss.

Load: 50 kg/cm$^2$
Lubricating Oil: Lubricating oil of SAE #30 for diesel engines. 1% of oleic acid was added to the SAE #30 oil.
Surface pressure: 4.5±0.5 kg/cm$^2$
Rotating speed of shaft: 2250 r.p.m.
Material of Shaft: S 45C
Shape of shaft: Slotted shaft as shown in FIG. 5. Surface roughness of 0.4–0.8 micron.
Journal Bearing: Inner diameter of 52 mm and width of 20 mm. Surface roughness of sliding surface of 0.4–0.8 micron.
Temperature of Lubricating oil: 140° C.
Testing time: 100 hours The testing machine used was a alternating dynamic load tester. The weight loss of the Samples after the test is illustrated in FIG. 6. As is apparent from FIG. 6, Samples 8, 10, 11 and 12 had a low weight loss by dynamic corrosion. These Samples also had a low chemical corrosion loss as is apparent from FIG. 2. The weight loss of the other Samples according to the present invention was almost equal in each case and, therefore, the weight loss tendency of these Samples did not strictly coincide with that in FIGS. 2 through 4.

What is claimed is:

1. A process for producing a bearing to be used in an internal combustion engine, said bearing comprising a base, a bearing material layer, and an at least quaternary alloy-overlay consisting of (i) from about 5% to about 20% of tin, (ii) from about 0.05% to about 10% of at least one element selected from the group consisting of indium and thallium, (iii) from about 0.05% to about 5% of at least one wear resistance-enhancing element selected from the group consisting of antimony, manganese, bismuth, nickel, copper, calcium, and barium, and (iv) lead and impurities in balance, all percentages being by weight, said process for forming said at least quaternary alloy-overlay comprising the steps of:

separately forming on said bearing material layer in any order, at least one first layer and at least one second layer structure, contiguous with each other, said at least one first layer comprising at least one element selected from the group consisting of indium and thallium; and said at least one second layer structure comprising at least one second layer consisting of one element, a binary alloy or a ternary alloy, said second layer structure comprising lead, about 5 to about 20% tin and from about 0.05 to about 5% of at least one wear resistance-enhancing element selected from the group consisting of antimony, manganese, bismuth, nickel, copper, calcium, and barium; and heating said first layer and said second layer structure to such a temperature that interdiffusion between said layer and layer structure takes place, thereby forming a single overlay layer comprising said at least quaternary alloy-overlay.

2. A process for producing a bearing to be used in an internal combustion engine, said bearing comprising a base, and an at least quaternary alloy-overlay consisting of (i) from about 5% to about 20% of tin, (ii) from about 0.05% to about 10% of at least one element selected from the group consisting of indium and thallium, (iii) from about 0.05% to about 5% of at least one wear resistance-enhancing element selected from the group consisting of antimony, manganese, bismuth, nickel, copper, calcium, and barium, and (iv) lead and impurities in balance, all percentages being by weight, said process for forming said at least quaternary alloy-overlay comprising the steps of:

separately forming on said base in any order, at least one first layer and at least one second layer structure, contiguous with each other, said at least one first layer comprising at least one element selected from the group consisting of indium and thallium; and said at least one second layer structure comprising at least one second layer consisting of one element, a binary alloy, or a ternary alloy, said second layer structure comprising lead, about 5 to about 20% tin, and from about 0.05 to about 5% of at least one wear resistance-enhancing element selected from the group consisting of antimony, manganese, bismuth, nickel, copper, calcium, and barium; and heating said first layer and second layer structure to such a temperature that interdiffusion between said layer and layer structure takes place, thereby forming a single overlay layer comprising said at least quaternary alloy-overlay.

3. A process according to claim 1 or 2, wherein said forming steps comprise:

forming on said bearing material layer a second layer portion comprising at least tin; and forming on said second layer portion a first layer comprising at least one element selected from the group consisting of indium and thallium.

4. A process according to claim 3, wherein said second layer is formed by electrolytic plating.

5. A process according to claim 2, wherein said second layer additionally comprises at least one of said wear resistance-enhancing elements.

6. A process according to claim 4, wherein said at least one wear resistance-enhancing element is selected from the group consisting of calcium and barium and is added into a plating bath in the form of fine powder.

7. A process according to claim 6, wherein said fine powder has a particle size from about 0.1 to about 1 micron and the additional amount of said fine powder in said plating bath is from about 10 to about 50 grams per liter.

8. A process according to claim 5, wherein said at least one wear resistance-enhancing element is copper or antimony and the same is dissolved in said plating solution.

9. A process according to claim 1 or 2 comprising the steps of:

forming by plating on said bearing material a base layer which consists of lead and tin;

forming on said base layer a first layer comprising at least one element selected from the group consisting of indium and thallium; and forming on said first layer a top layer of said second layer structure comprising said wear resistance-enhancing element.

10. A process according to claim 9, wherein said wear resistance-enhancing element of said top layer is selected from the group consisting of manganese, bismuth, and nickel and said top layer is formed by plating.

11. A process according to claim 2, wherein the content of tin in said second layer structure after the formation thereof is less than about 10%.

12. A process according to claim 1 or 2, said process comprising the steps of:

forming on said bearing material layer a layer of said second layer structure comprising at least lead and tin;

forming on said layer of said second layer structure a first layer comprising at least one element selected from the group consisting of indium and thallium;

forming on said first layer an additional layer of said second layer structure of tin; and heating said layer, first layer, and additional layer to such a temperature that interdiffusion between these layers takes place, thereby forming a single overlay layer comprising said at least one quaternary alloy-overlay.

13. A process according to claim 12, wherein the tin content of said overlay layer is not less than 10%.

14. A process according to claim 12, wherein said interdiffusion is a solid-solid diffusion.

15. A process for producing a bearing to be used in an internal combustion engine, said bearing comprising a base, a bearing material, an at least quaternary overlay, and an additional top plating layer of tin, said overlay consisting of (i) from about 5% to about 20% of tin, (ii) from about 0.05% to about 10% of at least one element selected from the group consisting of indium and thallium, (iii) from about 0.05% to about 5% of at least one wear-resistance-enhancing element selected from the group consisting of antimony, manganese, bismuth, nickel, copper, calcium, and barium, and (iv) lead and impurities in balance, all percentages being by weight, said process for forming said at least quaternary alloy-overlay comprising the steps of:

separately forming on said bearing material base, in any order, at least one first layer and an at least one second layer structure, contiguous with each other, said at least one first layer comprising at least one element selected from the group consisting of indium and thallium; and an at least one second layer structure comprising one element, a binary alloy, or a ternary alloy, wherein at least one layer of said second layer structure comprising lead, tin, and at least one wear resistance-enhancing element selected from the group consisting of antimony, manganese, bismuth, nickel, copper, calcium, and barium;

forming on said second layer structure an additional top layer of tin; and heating all of said layers to such a temperature that interdiffusion between the layers takes place, thereby forming a single overlay layer and said additional top layer of tin which is formed by the non-diffused remaining tin, said second layer structure and tin diffused from said additional layer of tin comprising said at least quaternary alloy-overlay.

16. A process for producing a bearing to be used in an internal combustion engine, said bearing comprising a base, an at least quaternary alloy-overlay, and an additional top plating layer of tin, said overlay consisting of (i) from about 5% to about 20% of tin, (ii) from about 0.05% to about 10% of at least one element selected from the group consisting of indium and thallium, (iii) from about 0.05% to about 5% of at least one wear-resistance-enhancing element selected from the group consisting of antimony, manganese, bismuth, nickel, copper, calcium, and barium, and (iv) lead and impurities in balance, all percentages being by weight, said process for forming said at least quaternary alloy-overlay comprising the steps of:

separately forming on said base at least one first layer and at least one second layer structure, contiguous with each other, said at least one first layer comprising at least one element selected from the group consisting of indium and thallium wherein said first layer is formed over said second layer structure;

and said at least one second layer structure consisting of one element, a binary alloy, or a ternary alloy, one said layer or a plurality of said layers comprising lead, about 5% to about 20% tin, and from about 0.05 to about 5% of at least one wear resistance-enhancing element selected from the group consisting of antimony, manganese, bismuth, nickel, copper, calcium, and barium;

forming on top of said second layer structure an additional layer of tin; and heating all said layers to such a temperature that interdiffusion between the layers takes place, thereby forming a single overlay layer and said additional tin top layer which is formed by the non-diffused remaining tin, the total content of tin in said at least quaternary alloy-overlay comprising the amount of tin in said second layer structure and said first layer structure and said tin diffused from said additional layer of tin creating the composition of said at least quaternary alloy-overlay.

17. A process according to claim 1, 2, 15 or 16 comprising the additional step of forming at least one barrier layer consisting of at least one metal selected from the group consisting of silver and nickel between said bearing material base and said overlay.

* * * * *